(12) United States Patent
Denz et al.

(10) Patent No.: US 6,898,511 B2
(45) Date of Patent: May 24, 2005

(54) METHOD AND DEVICE FOR MONITORING A PRESSURE SENSOR

(75) Inventors: Helmut Denz, Stuttgart (DE); Ernst Wild, Oberriexingen (DE)

(73) Assignee: Robert Bosch GmbH, Stuttgart (DE)

( * ) Notice: Subject to any disclaimer, the term of this patent is extended or adjusted under 35 U.S.C. 154(b) by 67 days.

(21) Appl. No.: 10/363,225

(22) PCT Filed: Jun. 20, 2002

(86) PCT No.: PCT/DE02/02255

§ 371 (c)(1),
(2), (4) Date: Mar. 6, 2003

(87) PCT Pub. No.: WO03/004849

PCT Pub. Date: Jan. 16, 2003

(65) Prior Publication Data

US 2004/0020282 A1 Feb. 5, 2004

(30) Foreign Application Priority Data

Jul. 6, 2001  (DE) .......................... 102 32 833

(51) Int. Cl.[7] .......................... F02D 41/22; G01L 27/00
(52) U.S. Cl. ...................... 701/114; 123/396; 73/118.2
(58) Field of Search .......................... 701/114; 123/396, 123/399; 73/117.3, 118.1, 118.2

(56) References Cited

U.S. PATENT DOCUMENTS 5,260,877 A    11/1993  Drobny et al. .............. 701/114
5,755,201 A    5/1998   Knoss et al. ................ 123/396
5,808,189 A    9/1998   Toyoda ....................... 73/118.2
6,213,068 B1 * 4/2001   Hassdenteufel ............. 73/118.1
6,536,411 B2 * 3/2003   Ganser et al. ......... 123/406.44

FOREIGN PATENT DOCUMENTS

| | | |
|---|---|---|
| DE | 197 40 918 | 10/1998 |
| DE | 197 27 204 | 1/1999 |
| DE | 197 40 191 | 3/1999 |
| DE | 100 21 639 | 1/2002 |
| EP | 0 769 612 | 4/1997 |
| WO | WO 1 02720 | 1/2001 |

* cited by examiner

Primary Examiner—Hieu T. Vo
(74) Attorney, Agent, or Firm—Walter Ottesen

(57) ABSTRACT

A method and an arrangement for monitoring a pressure sensor are suggested which determines a value representing the ambient pressure of an internal combustion engine. Furthermore, an index for the extent of the correction of the mixture composition via the mixture control system is determined and the supplied air mass is detected from the throttle flap angle and the intake manifold pressure. A fault in the determination of the ambient pressure is detected when the measured air mass deviates from the computed air mass and the correction of the mixture control system is less than a predetermined limit value and when, for an open throttle flap, intake manifold pressure and ambient pressure deviate impermissibly from each other.

9 Claims, 2 Drawing Sheets

METHOD AND DEVICE FOR MONITORING A PRESSURE SENSOR

FIELD OF THE INVENTION

The invention relates to a method and an arrangement for monitoring a pressure sensor which detects the ambient pressure of the engine or the motor vehicle equipped with this engine in combination with the control of an internal combustion engine.

BACKGROUND OF THE INVENTION

Control systems for internal combustion engines include a plurality of sensors whose signals are evaluated for the engine control in combination with the load detection. The typical sensors include an air mass sensor for measuring the air mass flow, which is supplied to the engine, an ambient air pressure sensor for measuring the ambient pressure of the internal combustion engine (atmospheric pressure), sensors for measuring the throttle flap angle in combination with a throttle positioning device as well as, if needed, a sensor for measuring the intake air temperature. The signals of these sensors are used for determining the engine load which, in turn, is essential for the formation of actuating quantities. For this reason, these signals have an influence on the mixture formation and the exhaust-gas composition. A monitoring of the correct function of these sensors is therefore necessary with a view to the increasing requirements imposed on the exhaust-gas composition.

For example, DE-A 40 04 085 (U.S. Pat. No. 5,260,877) shows, in combination with the detection of the throttle flap angle, the use of two mutually redundant sensors for detecting the throttle flap angle. A fault function of one of the sensors is derived from the signals by way of a comparison of these signals to each other.

For monitoring an air mass sensor, DE-A 195 13 370 (U.S. Pat. No. 5,755,201) describes a procedure wherein a fault is assumed in the region of the air mass sensor when the output signal of a lambda controller exceeds a pregiven limit value, that is, when an excessive correction of the mixture formation by the lambda controller is detected.

A further procedure for monitoring the operation of the air mass sensor is described in DE-A 197 40 918. Here, the air mass flow via the throttle flap is determined on the basis of model quantities and measurement quantities in dependence upon the detected throttle flap angle and is compared to the air mass flow measured by the air mass sensor. At least one corrective factor is formed in dependence upon the deviation between the two quantities. The magnitude of this corrective factor can be applied as an index for faults in the region of the air mass detection via the air mass sensor and/or in the region of the air mass detection with respect to the throttle flap angle.

An air mass flow signal is measured in DE 197 50 191 A1 and a further air mass flow signal is computed on the basis of a throttle flap position signal. The two signals are matched to each other. For fault monitoring, the matched signals are compared to each other and a fault is detected when the two signals deviate impermissibly from each other. A torque reduction and a fault separation is undertaken when faults are detected.

Depending upon the embodiment, the signal value of the ambient pressure sensor is significant, for example, in the described matching or for the adjustment of the throttle flap of the internal combustion. For this reason, there is also the need for a fault detection of this sensor.

The monitoring of an ambient pressure sensor is known from the non-published German patent application DE 100 21 639.0 of May 4, 2000. There, in the unthrottled operation of the internal combustion engine (that is, for an opened throttle flap), the signal of the ambient pressure sensor is compared to a computed intake manifold pressure value. A malfunction is assumed when there is an impermissible deviation of these two values.

SUMMARY OF THE INVENTION

The procedure described hereinafter permits a clear detection of a malfunction in the region of the ambient pressure detection. With this procedure, a further signal path is made reliable which, in the case of a fault, can have relevant effects for the exhaust-gas composition. Corresponding demands are reliably satisfied.

It is especially advantageous that the detection is supported on available signals without additional components, for example, a redundant sensor, being needed.

BRIEF DESCRIPTION OF THE DRAWINGS

The invention is explained in greater detail in the following with reference to embodiments shown in the drawing.

DESCRIPTION OF THE PREFERRED EMBODIMENTS OF THE INVENTION

Figure 1:
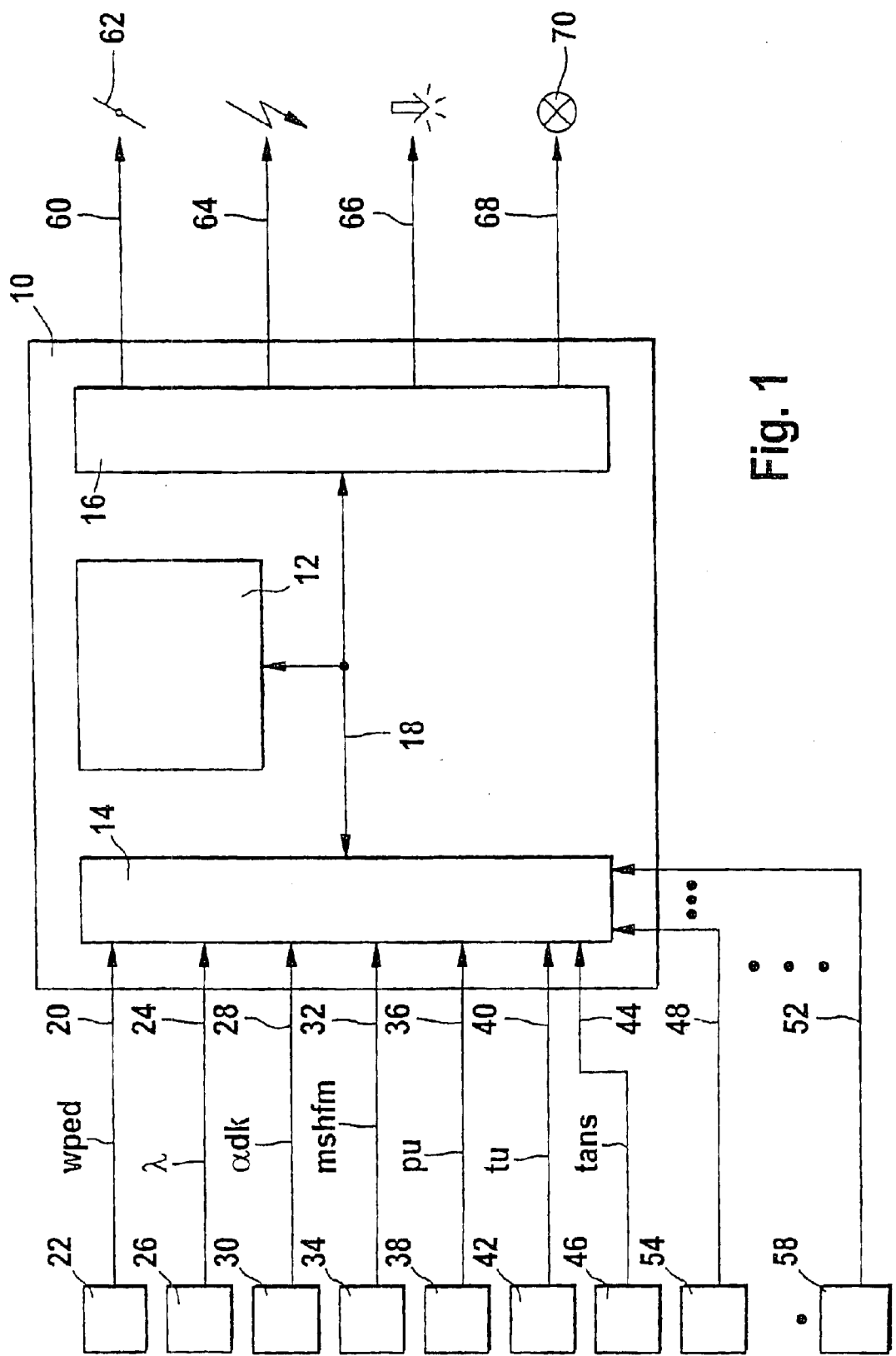
FIG. 1 shows an overview block diagram of a control unit for controlling an internal combustion engine; whereas, in FIG. 2, a detailed sequence diagram of the preferred embodiment for detecting a fault in the ambient pressure sensor is shown.

FIG. 1 shows an electronic control unit 10 for controlling an internal combustion engine which includes: a microcomputer 12, an input circuit 14, an output circuit 16 as well as a communication system 18 connecting these elements. Various input lines lead to the input circuit 14 and connect the control unit 10 to measuring devices for detecting various operating variables of the engine and/or of the vehicle. With a view to the preferred embodiment described hereinafter, especially the following input lines are noted: an input line 20 from a measuring device 22 for detecting the accelerator pedal position wped; an input line 24 from at least one exhaust-gas sensor 26 for detecting a quantity for the exhaust-gas composition lambda; an input line 28 from at least one measuring device 30 for detecting the throttle flap angle αdk; an input line 32 from an air mass sensor 34 for detecting the air mass flow mshfm supplied to the internal combustion engine; an input line 36 from an ambient pressure sensor 38 for detecting the ambient pressure pu (corresponding to the atmospheric pressure); an input line 40 from a temperature sensor 42 for detecting the ambient temperature tu; an input line 44 from a measuring device 46 for detecting the intake air temperature tans. Furthermore, input lines 48 to 52 are provided from measuring devices 54 to 58 via which additional operating variables such as intake manifold pressure, engine temperature, engine rpm, et cetera are detected. Control quantities for the internal combustion engine are outputted by the output circuit 16 via corresponding output lines. In FIG. 1, the following are shown by way of example: an output line 60 for controlling an electrically actuable throttle flap 62; output lines 64 for adjusting the ignition; output lines 66 for driving injection valves; and, an output line 68 for actuating a warning light 70.

In the preferred embodiment, a desired torque value is inputted for controlling the engine in the context of the programs, which are implemented in the microcomputer 12, in dependence upon at least the accelerator pedal position signal wped. This desired torque value is converted into a desired throttle flap angle. The desired throttle flap angle is adjusted in the context of a position control by actuating the electrically controllable throttle flap 62. The actuating signals for ignition and fuel injection are formed on the basis of the operating state, which is characterized by load and rpm, as well as, if needed, the deviation between the actual and desired torques.

Furthermore, an actual value (for example, actual torque value) is formed on the basis of the air mass signal. For reasons of redundancy, a value for the air mass flow via the throttle flap is determined in dependence upon the throttle flap position signal. Preferably, an intake manifold pressure is used which is modeled by means of an intake manifold model. Corrective values are determined from comparing the air mass flows and these corrective values correct the air mass flow detection and the throttle flap adjustment. A procedure such as this is also known from the state of the art.

The ambient pressure signal is evaluated with the computation of the air mass flow via the throttle flap as well as with the computation of the throttle flap angle. Furthermore, the following play an important role: the air mass flow, which is measured by the air mass sensor; the throttle flap angle, which is measured by the throttle flap transducer; and, when detected, the intake manifold air temperature which is measured by the temperature sensor. A monitoring of these essential influence quantities is necessary. Here, the monitoring of the throttle flap angle detection takes place, as a rule, via redundant sensors whose deviation to a pregiven tolerance is checked. A further diagnosis is based on the different determination of the air mass flow which, on the one hand, is measured with the air mass sensor, and on the other hand, is computed in dependence upon the throttle flap angle. If these two values lie far apart, an additional inquiry takes place as to whether the lambda control must very greatly correct the air/fuel mixture. If this is the case, a fault of the air mass sensor is assumed because, in the preferred embodiment, the computation of the fuel mass to be injected is based on this signal. In the other case, a fault in the so-called throttle flap system (quantities: throttle flap angle, ambient pressure, if needed, intake air temperature and intake manifold pressure) is assumed. The latter could be caused by the following: the ambient pressure detection; the intake air temperature detection; a leakage in the intake manifold system; or, the intake manifold pressure detection.

In this preferred embodiment, it has been shown that the ambient pressure signal is to be assumed to be defective, when, as shown above, the throttle flap system is defective and the throttle flap is open wide and the ambient pressure is very different from the intake manifold pressure and, when this signal is detected, the intake air temperature signal is plausible.

Generally, one proceeds therefore as follows for diagnosing the ambient pressure signal. The ambient pressure signal is assumed to be defective when: the air mass signal, which is formed in dependence upon the throttle flap angle, is defective; the throttle flap is wide open; and, the ambient pressure is greatly different from the intake manifold pressure; and (when utilizing to determine the throttle flap angle supported air mass signal) the intake air temperature detection is plausible.

Accordingly, if the signal of the ambient pressure sensor is incorrect, then a fault must be detected after a longer driving operation with full load components. If at least one factor of the lambda control (which represents the extent of the mixture correction) is included in the diagnosis, then a fault is only detected for an active control. If one would repeat the measurement with the switched-off lambda control after resetting the factor, then no fault of the ambient pressure sensor is indicated because a fault in the throttle flap system cannot be checked.

Figure 2:
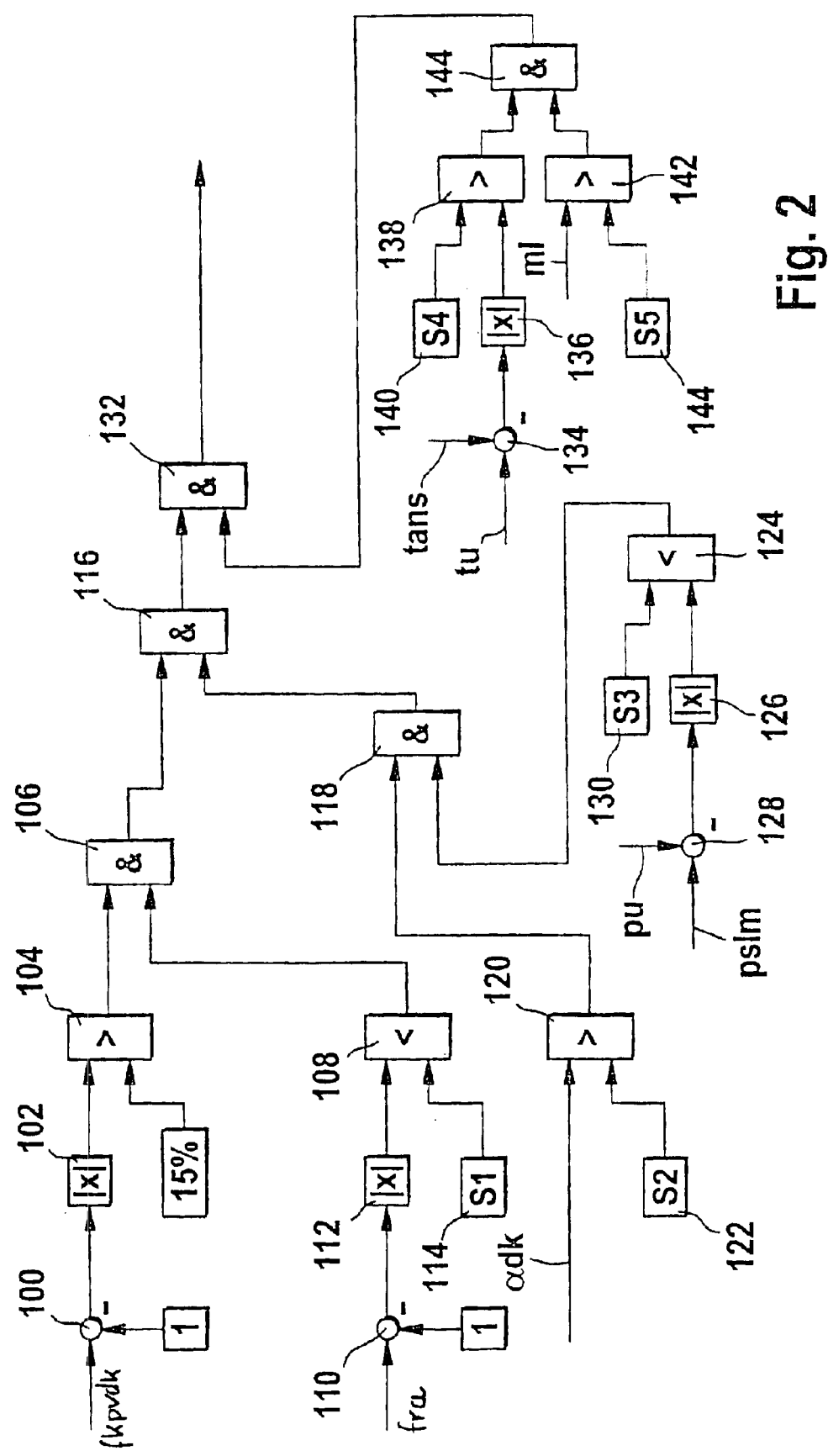

FIG. 2 shows a sequence diagram for executing the above-described diagnosis of the ambient pressure sensor in the preferred embodiment. The sequence diagram represents a program which runs in the microcomputer 12 of the electronic control unit 10. The individual blocks describe program steps, program parts or programs, whereas the connecting lines represent the information flow.

First, the adapting factor fkpvdk is read in, which results from the deviation between the measured air mass flow and the air mass flow computed in dependence upon the throttle flap angle. This adapting factor is, for example, determined as in the state of the art. The factor is, for example, determined from an integration of this deviation. This factor serves to adapt the computation of the air mass flow via the throttle flap and finally effects an adaptation of the mass flows (measured and computed) to each other. In the logic position 100, the value 1 is subtracted from the corrective factor in the specific embodiment and, in 102, the magnitude of this value is formed and, in the comparator 104, this magnitude is compared to a limit value, for example, 15%. The corrective factor defines an index as to how much the air mass flow, which is computed via the throttle flap angle, departs from the air mass flow measured by the air mass sensor. The comparator 104 generates a signal when the corrective factor is greater than the pregiven limit value. A second comparator 108 checks as to whether a quantity fra of the lambda control (for example, the long time component of the mixture correction) exceeds a pregiven limit value. The quantity fra represents the mixture correction. In a specific embodiment, the value 1 is subtracted from the mixture adaptation factor in the logic position 110 and, in 112 the magnitude of the difference is formed and, in comparator 108, this magnitude is compared to the limit value S1 which is stored in 114. If the mixture adaptation factor drops below this limit value, then it is to be assumed that the air mass signal, which is measured by the air mass sensor, is correct. The latter is the basis for the fuel mass computation and therefore determines the mixture formation. If the measured air mass signal is correct, the mixture composition is also correct so that the lambda control need not intervene correctively to too great an extent. If the value, which is derived from the mixture adaptation factor, is therefore less than the limit value, then the comparator 108 generates a positive signal. The signals of the comparators 108 and 104 are combined in an AND logic element 106. If the air mass flow, which is computed via the throttle flap position, deviates greatly from the measured air mass flow (positive signal of the comparator 104) and if the mixture corrective factor is below the limit value (positive signal of the comparator 108), then the AND logic element 106 generates an output signal which indicates a fault in the throttle flap system (computation of the air mass flow dependent upon throttle flap angle and other operating variables).

In a comparator 120, a check is made as to whether the measured throttle flap angle αdk exceeds a threshold value S2 (122). Furthermore, a check is made in a comparator 124 as to whether a magnitude, which is formed in 126, exceeds a threshold value S3 (130), that is, whether this threshold value is less than the amount. This amount is the amount of the deviation, which is formed in 128, between the intake manifold pressure (preferably modeled) and the ambient pressure pu. The signals of the comparators 120 and 124 are combined by an AND logic position 118. If both comparators emit positive signals (throttle flap angle greater than S2, that is, almost completely opened, the magnitude of the deviation between the intake manifold pressure and the ambient pressure is greater than S3), the AND logic position 118 generates a positive signal which indicates a fault in the pressure comparison at full load. As shown in the state of the art, the intake manifold pressure is modeled on the basis of the air mass signal. For this reason, the ambient pressure is compared to the modeled intake manifold pressure when the throttle flap is open (when the throttle flap drops below the threshold value S2). The two values must essentially be coincident for fault-free ambient pressure and intake manifold pressure. Therefore, if a deviation between the ambient pressure and the intake manifold pressure is nonetheless detected, then the fault must lie in the air temperature sensor or the ambient pressure sensor because the air mass sensor signal is correct.

The signals of the AND logic positions 106 and 118 are supplied to an additional AND logic position 116. AND logic position 116 generates a positive signal when corresponding signals of the logic positions 106 and 118 are applied to its inputs, that is, when the throttle flap system is burdened with a fault and the pressure comparison was defective. In this case, a fault is to be excluded in the intake manifold pressure determination (because the air mass measurement is okay) so that the positive output signal of the AND logic position 116 indicates a fault in the ambient pressure sensor or in the air temperature sensor.

The plausibility of the air temperature signal is determined in that the deviation between the ambient temperature signal tu and the intake air temperature signal tans is formed in the logic position 134. The magnitude of this deviation (136) is compared to a threshold value S4 (140) in a comparator 138. Furthermore, an air flow signal ml (for example, the signal of the air mass sensor) is compared to a threshold value S5 (144) in a comparator 142. Accordingly, for high air flow, if the deviation between the ambient temperature and the intake air temperature is less than a threshold value, then a plausible air temperature sensor signal is assumed via an AND logic position 144 of the two pieces of information.

The signals of the AND logic positions 116 and 144 are supplied to an AND logic position 132. If positive signals are applied to the inputs of the AND logic position 132 (when the air temperature signal is plausible and the AND logic position 116 indicates a fault), a fault of the ambient pressure sensor is assumed and a corresponding signal is outputted. This signal then leads, for example, to an entry into the fault memory or to driving the warning lamp 70.

The above described procedure is applied in a preferred embodiment. In other embodiments, other boundary conditions are present, for example, the intake manifold pressure is not modeled and is instead measured. In this case, the correct measurement of the intake manifold pressure must be ensured in another way. Furthermore, in other embodiments, the ambient air temperature is not considered in the detection of loads so that one can do without the plausibilization of this signal. Furthermore, in other embodiments, other corrective factors are formed which define the deviation between the throttle flap based air mass signal and the measured air mass signal. What is essential is only that a factor, which defines this deviation, is formed which is then subjected to the described comparison measures.

In other embodiments, the formation of a throttle flap angle based air mass signal is entirely omitted so that there, for checking the ambient pressure sensor, only a comparison of the measured air mass signal to the mixture adaptation factor takes place to ensure that the measured air mass signal is correct. Then, with the throttle flap opened, the deviation between intake manifold pressure and ambient pressure is checked to a predetermined limit value so that a fault is determined in the ambient pressure sensor when, for a correctly measured air mass signal, a deviation, which is too large, is present between the ambient pressure and the intake manifold pressure for a wide-opened throttle flap.

Furthermore, the computation and comparison step shown in FIG. 2 are exemplary. Other realizations are possible. For example, the factors are directly compared (without subtraction of 1).

What is claimed is:

1. An arrangement for monitoring a pressure sensor for determining the ambient pressure of an internal combustion engine, the arrangement comprising:

an electronic control unit including means for forming an index for the extent of the correction of the mixture composition via a mixture control system and which detects an index for the throttle flap angle and an index for the supplied air mass; the control unit further including means for detecting a fault in the region of the ambient pressure determination on the basis of the following: the extent of the correction of the mixture composition via the mixture control system; the throttle flap angle; the supplied air mass; and, a plausibility comparison of the ambient pressure for a wide-opened throttle flap.

2. A method for monitoring a pressure sensor for determining a value representing the ambient pressure of an internal combustion engine, the method comprising the steps of:

forming an index for the extent of the correction of the mixture composition via a mixture control system; detecting an index for the throttle flap angle and detecting an index for the supplied air mass;

detecting a fault in the region of the ambient pressure determination on the basis of the following: the extent of the correction of the mixture composition via the mixture control system; the throttle flap angle; the supplied air mass; and, a plausibility comparison of the ambient pressure with a wide-opened throttle flap.

3. The method of claim 2, wherein an air mass value is computed in dependence upon the throttle flap angle; a deviation factor is formed between the measured supplied air mass and the computed air mass value; the deviation factor is compared to a pregiven limit value and a fault in the charge detection is detected when there is an impermissible deviation.

4. The method of claim 3, wherein a check is made for an impermissible deviation of the air mass value as to whether the correction of the mixture control system is less than a pregiven limit value and, in this case, a fault is detected in the region of the throttle flap dependent air mass computation.

5. The method of claim 4, wherein a fault in the ambient pressure sensor is assumed for an assumed fault in the determination of the throttle flap angle based air mass signal when, for an opened throttle flap, the ambient pressure is much different from the intake manifold pressure.

6. The method of claim 5, wherein the intake manifold pressure is modeled on the basis of the measured air mass signal.

7. The method of claim 3, wherein, additionally, the fault detection takes place on the basis of the intake air temperature, especially, a fault is detected in the ambient pressure sensor when, for an assumed fault in the determination of the throttle flap angle based air mass signal, the throttle flap is wide opened, the ambient pressure deviates greatly from the intake manifold pressure and the intake air temperature signal is plausible.

8. The method of claim 2, wherein the intake air temperature is determined.

9. The method of claim 8, wherein the intake air temperature is plausible when, for a large air flow, the air temperature and intake air temperature do not deviate impermissibly from each other.

* * * * *

UNITED STATES PATENT AND TRADEMARK OFFICE
CERTIFICATE OF CORRECTION

PATENT NO. : 6,898,511 B2
DATED : May 24, 2005
INVENTOR(S) : Helmut Denz and Ernst Wild It is certified that error appears in the above-identified patent and that said Letters Patent is hereby corrected as shown below:

Title page,
Item [30], Foreign Application Priority Data, delete "102 32 833" and substitute -- 101 32 833 -- therefor.

Signed and Sealed this

Sixteenth Day of August, 2005

JON W. DUDAS
*Director of the United States Patent and Trademark Office*